UNITED STATES PATENT OFFICE.

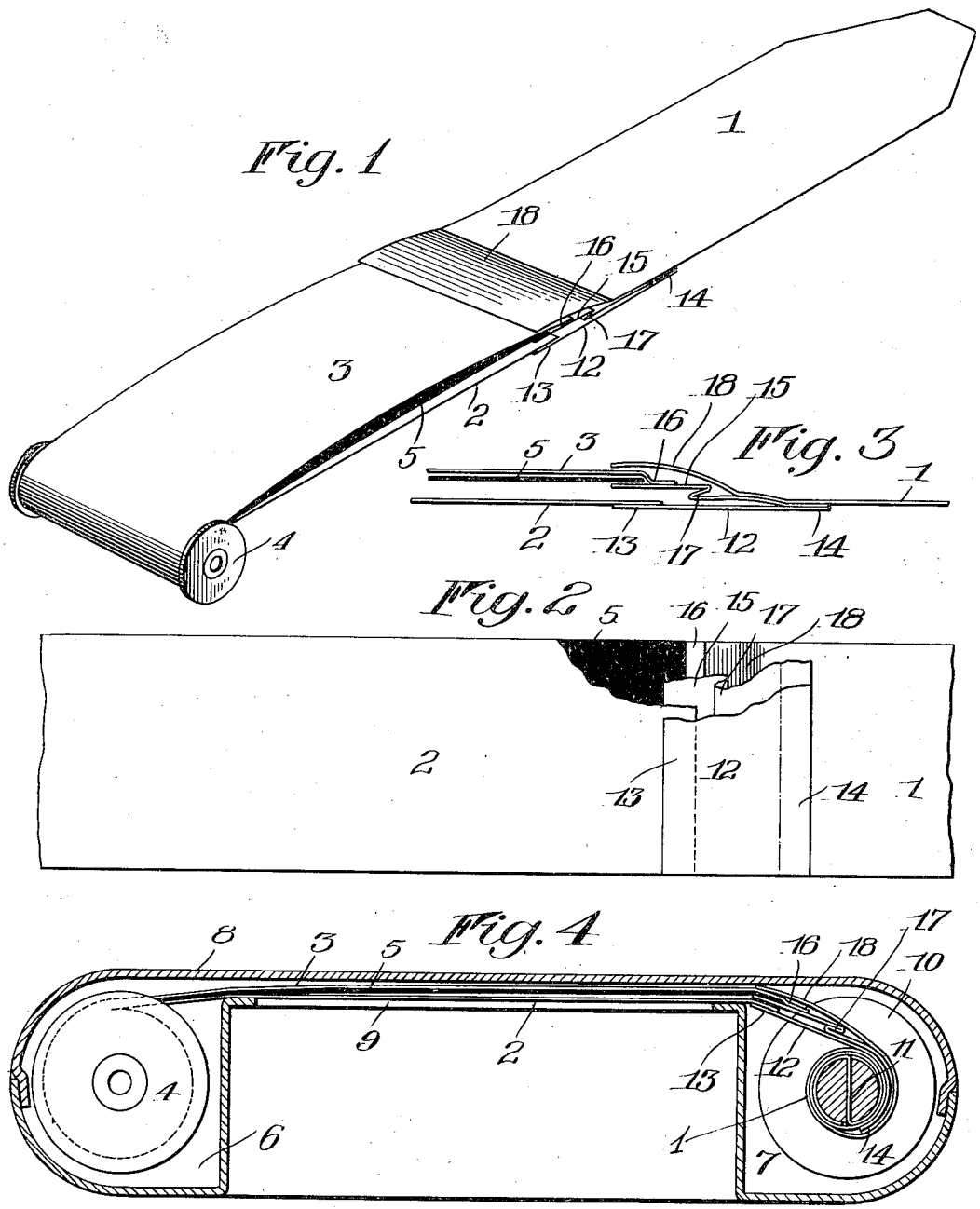

JOHN G. JONES, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

1,255,017.  Specification of Letters Patent.  Patented Jan. 29, 1918.

Application filed August 28, 1916. Serial No. 117,274.

*To all whom it may concern:*

Be it known that I, JOHN G. JONES, of Rochester, in the county of Monroe and State of New York, have invented certain new and useful Improvements in Photographic-Film Cartridges; and I do hereby declare the following to be a full, clear, and exact description of the same, reference being had to the accompanying drawings, forming a part of this specification, and to the reference-numerals marked thereon.

My present invention relates to photography and more particularly to film cartridges for cameras in which a strip of sensitive film is wound, together with a protective backing of non-actinic or light-resisting material, upon a spool or roll for insertion in a camera and then unrolled therein to successively expose picture areas on the film and my invention has for its object to provide a simple, cheap and efficient means for shifting the strain of the winding off device from the backing to the film strip itself so that the latter will be drawn taut and will lie flat in the focal plane of the camera while being exposed. The improvements are directed in part toward making a quick acting compensating device for relieving the strain on the backing and toward reducing irregularities in that surface of the unwound cartridge that is exposed to the interior of the camera. To these and other ends the invention resides in certain improvements and combinations of parts all as will be hereinafter more fully described, the novel features being pointed out in the claims at the end of the specification.

In the drawings:

Figure 1 is a perspective view of a film cartridge constructed in accordance with and illustrating one embodiment of my invention, the advance end thereof being partially unrolled;

Fig. 2 is a plan view of the unrolled portion with the parts broken away to show the positions of the superposed elements;

Fig. 3 is a fragmentary side elevation, and

Fig. 4 is a sectional view of a camera showing the cartridge partially unwound therein.

Similar reference numerals throughout the several views indicate the same parts.

As to its major elements, the cartridge comprises, as usual, a leader 1 at the outer end of the cartridge connected to a film strip 2 and to a backing 3 superposed upon and protecting the latter, all wound together upon a spool 4. In the present instance, a strip of carbon paper 5 is shown interposed between the film and backing for recording and light printing marks upon the film or negative in a manner now well known.

Referring now to Fig. 4, in which 6 and 7 indicate, respectively, the supply and wind-up film chambers of a camera 8 from the former of which the film is drawn across the exposure opening 9 onto a spool 10 arranged in the latter, the cartridge spool 4 is mounted in the chamber 6 and the leader 1 is threaded into a slot 11 in the winding-off spool 10 to draw the film across. As the various strips leave the roll 4, the backing 3 is outermost and the film 2 is innermost, as shown, and as these two strips pass onto the spool 10, the backing 3 forms an outer convolution over an inner convolution of the film strip 2. In other words, the backing 3 is constantly winding upon a greater diameter or forming a convolution of larger circumference than is the film strip 2, with the result that it winds faster and has a tendency to become taut and take the winding strain instead of the film strip 2, which latter should take the strain in order not to buckle in the focal plane opposite the exposure opening 9. Furthermore, the smaller the core or center upon which the winding takes place, the more pronounced will be the discrepancy and hence the trouble will be more pronounced during the first few windings than later on, it being borne in mind that while the spool 4 is unwinding or feeding the backing from an outer diameter and hence faster than the film 2, this roll is large at the time the roll on the winding-up spool 10 is small.

With mark recording cartridges such as the one shown embodying the interposed strip of carbon 5, lighter material than usual is used for the leader 1 and backing 3 for several reasons, one of which is that this strip of carbon 5 increases the bulk just that much and it is desired that the cartridge or wound spool be not larger in diameter than usual but on the contrary, that it be as small in diameter as possible. Therefore, while it might be possible to keep the tension sufficiently on the film strip for practical purposes by increasing the length of the leader 1 when of thin material, or using thicker material therefor to build up the roll on the spool center 10 sufficiently to reduce the discrepancy in the rate of winding of the backing and film strip, these schemes are objectionable and I prefer to employ the following instrumentalities.

I attach the film strip 2 to the leader 1 by means of a coupling strip or sticker 12 of thin paper, one end of which is secured to the film at 15 and the other end to the leader at 14. I similarly secure the backing 3 to the leader 1 at 14 through the medium of a coupling strip 15 of thin paper pasted to the backing at 16. As shown in Fig. 3, the end of the carbon strip 5 may be retained loosely between the projecting edge of the sticker and the backing at this point, no attempt being made to attach it to either though if in the process of assembling the sticker, the edge of the carbon should become caught, as often occurs, no harm is done. This coupling strip 15, however, has a looped or doubled portion 17 therein formed by a fold creased transversely of the strips and adapted to straighten out when pulled upon. The rear end of the leader 1 beyond the point 14 at which it is attached to the other part, is extended beyond the point 16, as shown at 18 to overlap both the fold 17 and the joint or seam at 16.

In the operation of drawing the material from the cartridge 4 through the camera during exposure of the film, the leader 1 is first threaded and wound upon the spool 10 as usual, but when the point in the winding operation illustrated in Fig. 4 is reached, the winding strain is necessarily taken directly by the film strip 2, for the loop 17 starts to straighten out, as shown, the moment the more rapid taking up on the outer convolutions of the several layers of material begins to be felt and the backing 3 becomes the part that is lengthened or eased upon and allowed to lie loose and free. The loop 17 will continue to supply an excess of backing length even after it has passed slightly onto the wind-up spool 10 and the roll already thereon and it will be noted that the bunching of the several layers of material formed in the region of the coupling strips 12 and 15 will have an instant material effect as they pass onto the roll in pulling the backing along faster than the film unless this compensating device is employed. The thinness of the material of the coupling strip 15 as compared with that of the leader 1 and backing 3 causes its loop to act very quickly or, in other words, causes it to be very sensitive to the winding strain. Furthermore, in this thin material, the loop causes very little additional bulk.

The overlapping extension 18 acts as a shield or shed for the loop 17 and the joint or seam 16 and prevents these irregularities from coming in contact with and perhaps catching upon the interior of the camera.

By the time the strips are sufficiently wound upon spool 10 to negative the functions of the loop 17, the two rolls are of about the same size and the tendency of the backing to take the winding strain is not so pronounced. The last few exposures being reached, the cartridge is sufficiently near the end where the film strip and backing lie unattached to each other, for these elements to creep relatively and adjust themselves.

I claim as my invention:

1. In a photographic film cartridge, the combination with a strip of sensitive film and a leader connected to the outer end thereof of a backing strip for the film and a coupling strip of relatively thin material connecting the backing to the leader and provided with a transversely creased fold to relieve the backing of winding tension and place the tension on the film strip.

2. In a photographic film cartridge, the combination with a strip of sensitive film and a leader connected to the outer end thereof, of a backing strip for the film, a coupling strip of relatively thin material connecting the backing to the leader and provided with a transversely creased fold to relieve the backing of winding tension and an extension on the leader overlapping the fold and the seam between the coupling strip and backing.

3. In a photographic film cartridge, the combination with a strip of sensitive film and a leader connected to the outer end thereof, of a backing strip for the film, a coupling strip connecting the backing to the leader and an extension on the leader overlapping the seam between the coupling strip and backing.

4. In a photographic film cartridge, the combination with a strip of sensitive film and a leader connected to the outer end thereof, of a backing strip for the film, a coupling strip connecting the backing to the leader and provided with a transversely creased fold to relieve the backing of winding tension and an extension on the leader overlapping the fold and the seam between the coupling strip and backing.

5. In a photographic film cartridge, the combination with a strip of sensitive film and a leader connected to the outer end thereof, of a backing strip for the film connected to the leader through an intermediate yielding fold in rear of the point of connection of the film and an extension on the leader overlapping the fold.

6. In a photographic film cartridge, the combination with a strip of sensitive film, a leader, and a backing strip, of a sticker connected at one end to the face of the backing strip and at the other end to the face of the leader and provided with an intermediate transverse fold, a sticker connected at one end to the film strip and at the other to the leader at the same point as the first mentioned strip, and an extension on the leader overlapping the fold in the said first mentioned strip and also the seam at its point of connection with the backing.

JOHN G. JONES.

Witnesses:
CLAYTON L. JENKS,
P. WESLEY HART.

Copies of this patent may be obtained for five cents each, by addressing the "Commissioner of Patents, Washington, D. C."